United States Patent
Chu

(10) Patent No.: US 10,273,795 B1
(45) Date of Patent: Apr. 30, 2019

(54) INTELLIGENT TOOL BUS NETWORK FOR A BOTTOM HOLE ASSEMBLY

(71) Applicant: Jianying Chu, Houston, TX (US)

(72) Inventor: Jianying Chu, Houston, TX (US)

(*) Notice: Subject to any disclaimer, the term of this patent is extended or adjusted under 35 U.S.C. 154(b) by 0 days.

(21) Appl. No.: 15/902,328

(22) Filed: Feb. 22, 2018

(51) Int. Cl.
*E21B 44/00* (2006.01)
*H04L 12/24* (2006.01)
*H04L 29/14* (2006.01)

(52) U.S. Cl.
CPC ........ *E21B 44/005* (2013.01); *H04L 41/0672* (2013.01); *H04L 41/12* (2013.01); *H04L 69/40* (2013.01)

(58) Field of Classification Search
CPC ... E21B 44/005; H04L 41/0672; H04L 41/12; H04L 69/40
See application file for complete search history.

(56) References Cited

U.S. PATENT DOCUMENTS

| | | | |
|---|---|---|---|
| 6,686,763 B1 | 2/2004 | Yen | |
| 8,264,369 B2 | 9/2012 | Hall et al. | |
| 2008/0061715 A1 | 3/2008 | Yang | |
| 2009/0289808 A1* | 11/2009 | Prammer | E21B 17/003 340/853.7 |
| 2011/0260538 A1 | 10/2011 | Huang | |
| 2012/0008938 A1* | 1/2012 | Tang | H04B 10/03 398/9 |
| 2014/0152460 A1* | 6/2014 | Santoso | E21B 47/12 340/854.9 |
| 2014/0229753 A1* | 8/2014 | Itou | G06F 1/3209 713/323 |
| 2014/0340990 A1 | 11/2014 | Chen et al. | |
| 2016/0320441 A1 | 11/2016 | Du et al. | |
| 2016/0343526 A1 | 11/2016 | Schicke, II | |
| 2017/0002540 A1* | 1/2017 | Fletcher | E02F 9/2041 |
| 2017/0002640 A1* | 1/2017 | Hoefel | G05B 23/0218 |
| 2017/0044834 A1* | 2/2017 | Peters | E21B 10/322 |
| 2017/0059637 A1 | 3/2017 | Santos et al. | |

(Continued)

OTHER PUBLICATIONS

Non-Final Office Action in copending U.S. Appl. No. 15/893,225, dated May 25, 2018.

(Continued)

*Primary Examiner* — James J Yang
(74) *Attorney, Agent, or Firm* — Meunier Carlin & Curfman LLC

(57) ABSTRACT

An intelligent tool bus network for a bottom hole assembly (BHA) that can enumerate the nodes on the bus to build a tool string layout map. During the enumeration, an enumeration master node (EMN) sequentially powers and tests additional sections of the bus and additional tool electronics. At each node, the EMN records the results of the tests in an enumeration log. For each good node, communication is established with the EMN to retrieve a node ID and node metadata. Using the enumeration log, the EMN builds a tool string layout map that includes information of each node, their relative location, and their operating status. The intelligent tool bus network also facilitates sectioning a bus into a plurality of sub-busses upon a sectioning event and rejoining the sub-busses. The sectioning event occurs as a result of a fault on the bus or a planned section division multiplexing event.

12 Claims, 6 Drawing Sheets

(56) References Cited

U.S. PATENT DOCUMENTS

2017/0331280 A1   11/2017   Koenecke et al.

OTHER PUBLICATIONS

U.S. Appl. No. 15/893,225, Final Office Action dated Sep. 6, 2018.
U.S. Appl. No. 15/893,225, Applicant-Initiated Interview Summary dated Aug. 6, 2018.
U.S. Appl. No. 15/893,225, Applicant-Initiated Interview Summary dated Oct. 9, 2018.

* cited by examiner

INTELLIGENT TOOL BUS NETWORK FOR A BOTTOM HOLE ASSEMBLY

FIELD OF THE INVENTION

The present disclosure relates to a communication network for use in a wellbore and more specifically, to an intelligent tool bus network for a bottom hole assembly (BHA) that can enumerate the nodes on the bus to build a tool string layout map and configure daughter bus sections (e.g., in response to a fault or by control from a master node).

BACKGROUND

Electronics are increasingly desired for testing, measurement, control, actuation, and communication in downhole (i.e., in a wellbore) applications, such as measurement while drilling/logging while drilling (MWD/LWD) and directional drilling (or geosteering), wireline logging, coil tubing, slickline services, and the like.

Downhole environments are harsh. Accordingly, electronics in a downhole environment may experience high pressures, conductive fluids, corrosive chemicals, severe vibrations, and mechanical shocks that are in excess of their designed specifications. As a result, protective packages typically house the electronics to insure reliable operation.

A BHA typically includes a plurality of these protective packages (i.e., segments) connected end-to-end at segment joints. Each segment encloses electronics to protect them from the harsh environments and operating conditions. Typically, the segments are constructed from high-strength metal or metal alloys and have a tubular form to allow the BHA to be easily moved through a borehole regardless of the trajectory of the borehole.

Adjacent segments can be electrically connected to form a network allowing the electronics in each segment to share data and electrical power. Accordingly, the electronics inside the segments may be networked to communicate with each other. Due to geometrical and structural constraints of the segment joints, however, the possible network topologies are limited.

Owing to its simplicity and reliability, one popular network topology used for downhole communication is a bus network. The bus network includes a common electrical path, or paths (i.e., a bus) passing through each segment, connecting the segments, and terminated at each end.

Tools are electronic devices that operate to perform a particular function (e.g., formation measurement and evaluation, drillstring monitoring and geosteering, etc.). The tools may tap into the bus (i.e., tool bus) as communicating nodes to exchange data/power. A group of tools exchanging power and data via a bus are referred to collectively as a tool bus network (i.e., tool string). The simplicity of the tool bus network unfortunately also makes it prone to failure.

The tool bus network described thus far can be disabled if any part of the bus fails (i.e., single point of failure). Troubleshooting the point (or points) of failure in a disabled tool bus network is difficult because communication over a failed tool bus network is impaired or disabled. As a result, in situ (i.e., while downhole) and/or on the fly (i.e., during a downhole process) troubleshooting methods may be unavailable, and instead, the BHA must typically be extracted from the well bore for troubleshooting. Adding to the problem, the electronics in the extracted segments are not easily tested (i.e., probed) because they are typically sealed within pressurized chambers. In these cases, the BHA must also be dismantled piece-by-piece to troubleshoot the failure. To make matters worse, the extraction of the BHA does not guarantee successful trouble shooting for a few reasons.

First, the act of extracting the BHA may change or obscure the point (or points) of failure. Second, it may be impossible to emulate downhole conditions at the surface. As result, it can be very difficult to replicate a failure caused by a downhole condition while the BHA is at the surface. Third, experienced trouble-shooters may not be available at a drill rig site. In these cases, a failed tool string must be shipped back to a nearby repair and maintenance (i.e., R&M) location or technology center for troubleshooting.

A failure (i.e., fault) in a tool bus network can be disruptive, costly, and can lead to unwelcomed outcomes. For example, the time spent troubleshooting is non-productive time (NPT) for the downhole application. Accordingly, a lengthy repair process and its excessive cost can lead to a negative customer response. In addition, the adoption and/or validation of new tools can be significantly hindered by the time/cost of such failures.

The tool bus network described thus far has additional limitations. The tool bus network is limited in its convenience and immunity to human error. For signal integrity, the tool bus network requires a proper termination at each endpoint of the bus to prevent reflections. Because each job for a drill rig may have different requirements, tools in a tool bus network are assembled into a particular configuration for each job (i.e., on an ad hoc basis). As a result, an added procedure of setting up terminations at the bus endpoints, according to a particular configuration, is required. In other words, permanently installing terminators in a tool bus network is not feasible.

For downhole measurements and test to be accurately analysed and interpreted, measurements of where each tool is located relative to the frontend drill bit are required. Typically, a tool string layout map is used for engineers or geophysicists to derive such information. In practice, a tool string layout map is generated manually by field personnel according to tool tracking records when the tool string is assembled. There is also additional work required to keep track of records integrity and updates so as to ensure a mistake-free process.

The tool bus network described thus far has a low channel efficiency. As multiple nodes share a common bus channel, multiplexing is imperative. Usually, time-domain multiplexing (TDM) is used in downhole design for its simplicity and resultant reliability. At one moment, TDM allows only one node to transmit signal to the bus. Signal propagates through the entire bus regardless how close the transmitting node is to the receiving nodes, which consequently lead to inefficient usage of the bus channel. Although frequency-domain multiplexing (FDM) and code division multiplexing (CDM) support multiple nodes transmitting simultaneously, the complexity of the schemes requires sophisticated hardware design which inevitably restrict their applications in downhole.

Efforts have been made to overcome some of the limitations of the bus network described above. For example, to address bus failures, U.S. Patent Publications 2017/0002640 and 2017/0059637 disclose sensing bus currents for an over current event. If an over current event is sensed, switches are used disable a portion of the tool string so that a different portion of the tool string can still operate. In both disclosures, the over current events result from short circuits. Short circuits, however, are only one mode of failure (i.e., fault) that the tool string may experience. The disclosures fail to address open-circuit failures and other faults, such as an intermittent bus connection, loss of a bus terminator, an erratic node response, and the like. In addition, neither disclosure teaches how to pinpoint the cause of the failure.

SUMMARY

Various aspects of the disclosure provide a method of automatically enumerating nodes of a tool bus in a bottom hole assembly (BHA). The method comprises powering a first section of the bus with a power source of a master node and testing, with a first test by the master node, the first section of the bus. The method also comprises connecting tool electronics of an adjacent node to the first section of the bus and testing, with a second test by the master node, the tool electronics of the adjacent node. The method further comprises updating, by the master node, an enumeration log based on an outcome of the first test on the first section of the bus and the second test on the tool electronics of the adjacent node. The method also comprises automatically generating, by the master node, a tool string layout map based on the enumeration log, wherein the tool string layout map includes an identification and a relative location of the adjacent node on the bus.

In some aspects of the disclosure, the tool string layout map further comprises an operating status of the first section of the bus and the tool electronics of the adjacent node.

In any of the above aspects of the disclosure, the identification of the adjacent node includes one or more of a type of the tool electronics of the adjacent node, an operating characteristic of the tool electronics of the adjacent node, or a requirement of the tool electronics of the adjacent node.

In any of the above aspects of the disclosure, the method further comprises powering a second section of the bus via the adjacent node and testing, with the first test by the master node, the second section of the bus. The method also comprises connecting tool electronics of a second adjacent node to the second section of the bus and testing, with the second test by the master node, the tool electronics of the second adjacent node. The method further comprises updating, by the master node, the enumeration log based on an outcome of the first and second tests. In some aspects of the disclosure, the method further comprises instructing, by the master node, for the adjacent node to disconnect the tool electronics of the adjacent node from the bus before powering the second section of the bus.

In any of the above aspects of the disclosure, the method further comprises detecting, with a third test by the master node, the presence of the adjacent node connected to the first section of the bus. In some aspects of the disclosure, the third test is an AC impedance test that detects whether a terminator of the adjacent node is connected to the first section of the bus. In some aspects of the disclosure, the AC impedance test comprises exciting an AC signal on the bus and sensing a DC current drawn by a signal transmitter of the master node that indicates a number of terminators connected to the bus.

In any of the above aspects of the disclosure, powering the first section of the bus comprises closing a tool switch in the master node to connect the power source of the master node to the first section of the bus. In some aspects of the disclosure, powering the first section of the bus further comprises closing a bus switch in the master node to connect the tool switch to the first section of the bus.

In any of the above aspects of the disclosure, the first test verifies whether there is a current leakage or a short circuit on the first section of the bus.

In any of the above aspects of the disclosure, connecting the tool electronics of the adjacent node to the first section of the bus comprises closing a second tool switch of the adjacent node. In some aspects of the disclosure, the first test is performed within a first time period before the second tool switch of the adjacent node closes. In some aspects of the disclosure, the second test is performed within a second time period before powering a second section of the bus via the adjacent node.

In any of the above aspects of the disclosure, the second test includes testing for one or more of an AC shortage in the adjacent node, an abnormal current consumption in the adjacent node, or a proper communication response by the adjacent node.

In any of the above aspects of the disclosure, the method further comprises polling, by the master node, the tool electronics of the adjacent node for metadata of the adjacent node that includes the identification of the adjacent node.

In any of the above aspects of the disclosure, the method further comprises instructing, by the master node, for the adjacent node to enter an idle state after the second test. In some aspects of the disclosure, the method further comprises instructing, by the master node, for the adjacent node to enter an operational state subsequent to generating the tool string layout map.

Various aspects of the disclosure provide a method of sectioning a tool string network from a unified bus to a mother sub-bus and at least one daughter sub-bus. The method comprises detecting a sectioning event at a bus section between two nodes, opening a bus switch connecting a first of the two nodes to the bus section, and opening a bus switch connecting a second of the two nodes to the bus section. The method also comprises detecting, by an enumeration master node in a standby state and connected to the daughter sub-bus, a loss of power or activity on the daughter sub-bus. In response to the detecting, the enumeration master node automatically promoting itself to a deputy state to initiate an enumeration of the daughter sub-bus.

In some aspects of the disclosure, the enumeration master node waits for a delay period before promoting itself to the deputy state. In some aspects of the disclosure, the delay period is based upon a relative location of the enumeration master node from an active enumeration master node on the unified bus.

In any of the above aspects of the disclosure, the method further comprises detecting a voltage on the daughter sub-bus after initiating the enumeration and stopping the enumeration if the voltage is for a higher priority than the enumeration master node. In some aspects of the disclosure, the higher priority voltage is a different voltage than a voltage produced by the enumeration master node for the enumeration.

Various aspects of the disclosure provide a method of a daughter sub-bus automatically re-joining with a mother sub-bus in a tool string network of a bottom hole assembly (BHA). The method comprises determining that a short circuit is not present on a bus section on the daughter sub-bus at a distal end of the daughter sub-bus. In response to the determination, repeatedly opening and closing a bus switch of a node in the daughter sub-bus that connects to the bus section and detecting a handshaking signal from a mother sub-bus when the bus switch is open to confirm that an open circuit fault is not present on the bus section. Upon detecting the handshaking signal, holding the bus switch closed to maintain a voltage on the bus section and re-joining the daughter sub-bus to the mother sub-bus.

In some aspects of the disclosure, the method further comprises placing a second handshaking signal on the bus section when the bus switch is closed during the repeatedly opening and closing of the bus switch.

In some aspects of the disclosure, the handshaking signal includes a different pulse pattern from the second handshaking signal.

In some aspects of the disclosure, the daughter sub-bus uses an operating voltage different than the mother sub-bus. In some aspects of the disclosure, detecting the handshaking signal includes detecting a voltage different than the operating voltage of the daughter sub-bus. In some aspects of the disclosure, if the operating voltage of the daughter sub-bus is lower than that of the mother sub-bus, detecting the handshaking signal includes detecting a higher-voltage of the mother sub-bus. In other aspects of the disclosure, if the operating voltage of the daughter sub-bus is higher than that of the mother sub-bus, detecting the handshaking signal includes detecting a current drawn by the mother sub-bus.

The foregoing illustrative summary, as well as other exemplary objectives and/or advantages of the disclosure, and the manner in which the same are accomplished, are further explained within the following detailed description and its accompanying drawings.

Other systems, methods, features and/or advantages will be or may become apparent to one with skill in the art upon examination of the following drawings and detailed description. It is intended that all such additional systems, methods, features and/or advantages be included within the scope of this description.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Some terminology used in the present disclosure may be typically defined as follows. A "tool" is a functional unit which may include electronics, sensors, and other components to execute particular functions. A tool may contain "tool electronics" that perform the function of the functional unit. A "tool string" (i.e., tool bus network) is a group of tools connected to a common tool bus for the exchange of data and power. A "segment" is a structural unit, which has sealed cavities to accommodate electronics, and which typically has a tubular form. A "bottom hole assembly" (BHA) is a group of segments that are connected end to end that that have tools installed inside. A tool may be contained within one segment, multiple segments (e.g., adjacent segments, interleaved segments), or may share a segment with one or more other tools. A "tool bus" (i.e., bus) is a common communication channel over which data and power can be exchanged, that is terminated at each distal end (i.e., endpoint). A "node" is alternate terminology for the functional unit. A node has only one access point to the tool bus, while a tool may have none, one, or multiple access points to the tool bus. Depending on the complexity of a tool, a tool may include one or multiple nodes. Additionally, multiple tools maybe integrated into one node. For simplicity, in what follows, a tool is assumed to include only one node and therefore the term "tool" may be used interchangeably with "node." This configuration is not intended to be limiting to the scope of the disclosure because, as mentioned above, the tool/node configuration may vary in practice. Additionally, the term "tool" is further used to specifically refer to the node backend electronics after the tool switch. However, it should be understood that this use does not imply any limitations of the principles and methods disclosed herein because tools may be embodied variously.

Conventional Tool Bus Network

Figure 1:
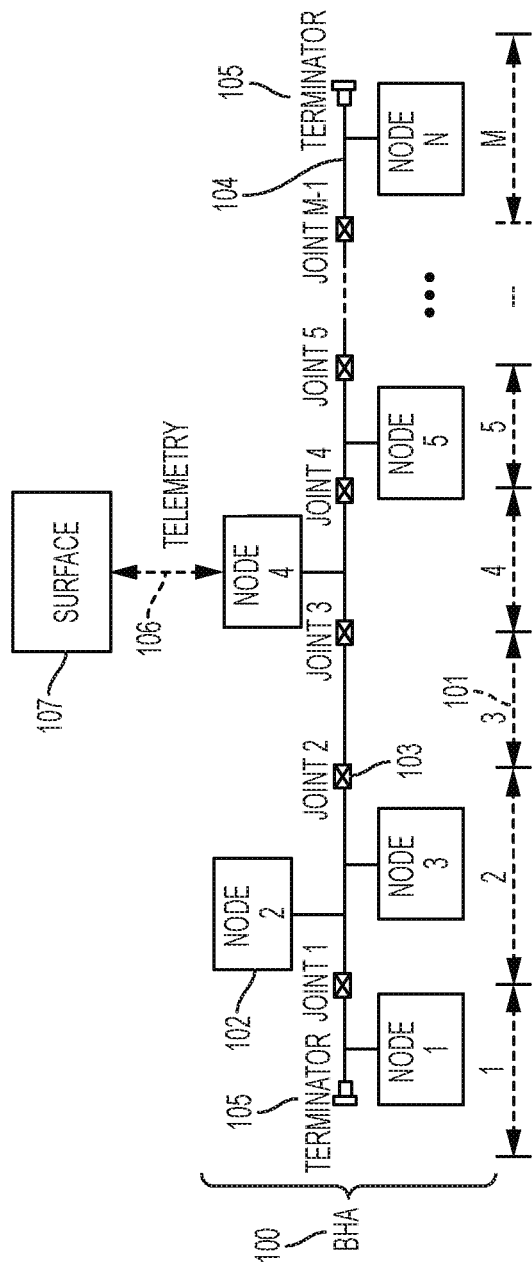
FIG. 1 is a schematic diagram of a conventional tool bus network according to current industry practice.

FIG. 1 is a schematic diagram of a conventional tool bus network for a BHA in accordance with current industry practice. A downhole BHA 100 includes M segments 101 that are connected end-to-end at M−1 joints 103.

A tool bus 104 spans these joints and extends to two distal endpoints at which terminators 105 are installed to prevent reflections. The tool bus 104 has N nodes 102 distributed along the M segments 101. N and M are integral numbers. For example, N is typically in the range of 2 to 16 and M is typically in the range of 2 to 8.

It is typical for at least one node 102 to communicate with the surface 107 through the telemetry 106. For example, as shown in FIG. 1, Node 4 communicates to equipment located at the surface of a wellbore (i.e., surface 107) using telemetry 106. The telemetry 106 is a point-to-point communication for real-time data and/or power transmission between the downhole BHA 100 and the surface 107. Various types of telemetry 106 may be used for this purpose. For example, the telemetry may be mud pulse, wired-pipe, continuous cable, electromagnetic (EM) wave, acoustic wave, or a combination thereof. As shown in FIG. 1, Node 4 functions as the interface between the tool bus 104 and the telemetry 106. Accordingly, this node performs all necessary protocol translation and power conversion between the two systems.

As shown in the FIG. 1, all nodes 102 are connected to one common path (i.e., the bus), which makes the network vulnerable to failure at any point along the bus. A failure can manifest as short circuit or open circuit and may arise within any connected node 102 or anywhere along the bus.

A short circuit may disable the network and can be characterized as alternating current (AC) short circuit or direct current (DC) short circuit. AC short circuits may occur at a signal transmitter within a node and can make driving the bus impossible. DC short circuits may occur anywhere and can result in a high current drawn from the bus power source.

An open circuit may also disable the network. An open circuit in a bus section 103 may impair communication because the open circuit causes signal reflections and because the terminator is effectively removed from the bus by the open circuit. An open circuit within a node 102 may only affect the node itself. The limiting of the affect is somewhat desirable for operation because the problematic node is effectively quarantined from the bus (i.e., by the open circuit).

Of all the failures, a failure at a joint 103 between segments can be most the most difficult to troubleshoot. For example, difficulty in troubleshooting may arise when the BHA is removed from the wellbore because the failure may "disappear" as the environment is changed. Accordingly, it is desirable to characterize these failures on the fly because downhole conditions are difficult to duplicate at the surface.

Intelligent Tool Bus Network

Figure 2:
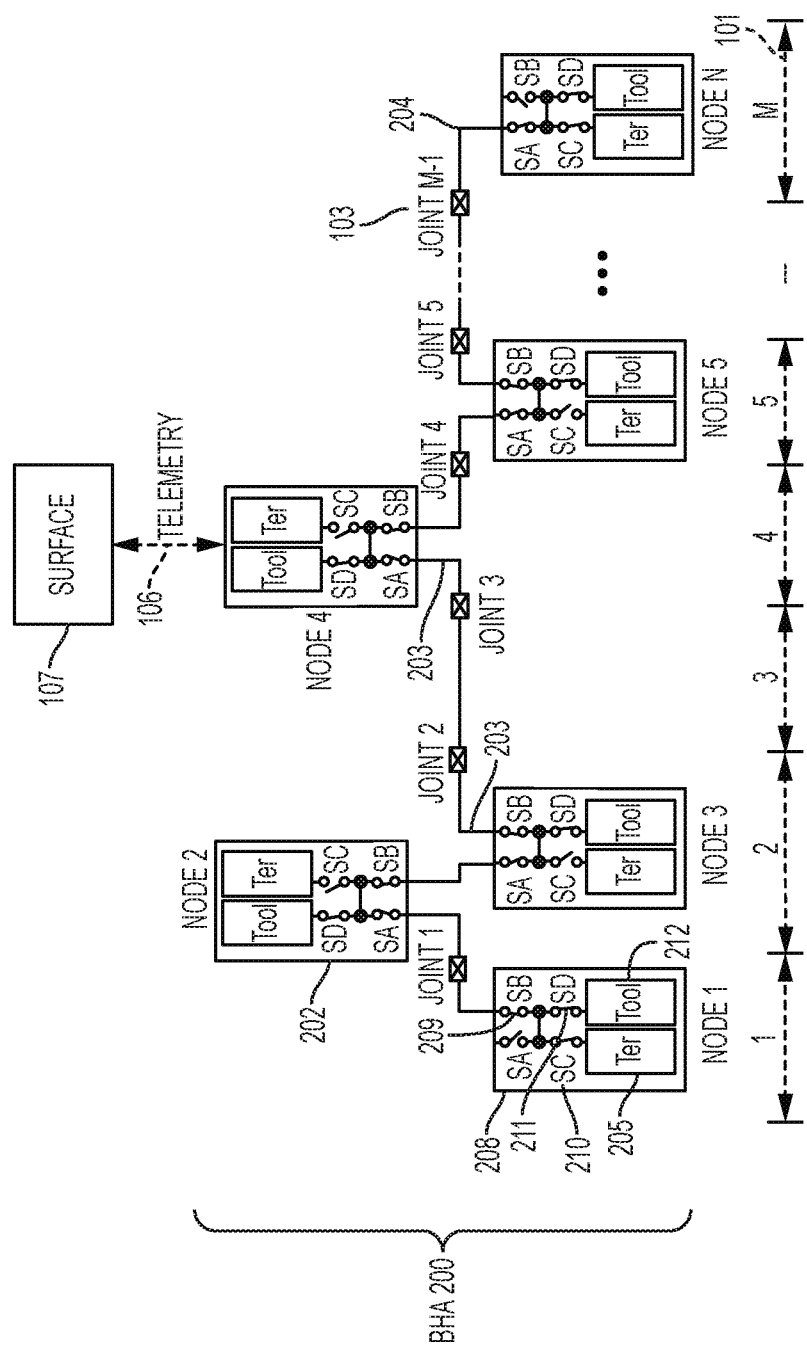
FIG. 2 is a schematic diagram of an intelligent tool bus network for a BHA in accordance with an exemplary embodiment of the present disclosure.

FIG. 2 is a schematic diagram of an intelligent tool bus network in accordance with an exemplary embodiment of the present disclosure. For ease in illustrating the principles and methods of the present disclosure, FIG. 2 illustrates an embodiment in which both power (i.e., bus power, power signal, etc.) and data (i.e., bus data, data signal, etc.) are transmitted together on a common electrical path (i.e., bus). It should be understood that the principles and methods disclosed herein might be used for embodiments in which power and data are transmitted separately through two (or multiple) common electrical paths.

As in the conventional embodiment described previously (FIG. 1), a BHA 200 includes M segments 101 connected in end-to-end and N nodes 202 distributed along the M segments. A tool bus (i.e., bus) 204 includes N−1 sections 203 that are joined together through the N nodes 202. Each section 203 is a bus channel between two adjacent nodes 202.

Unlike the conventional embodiment described previously, each node 202 includes switches that allow the network to be configured (or reconfigured) without removing the BHA 200 from downhole (e.g., during a wellbore process). The tool bus network is intelligent and versatile because each section 203 and each node 202 of the bus 204 can be controlled independently or in sequence to achieve varied functions. For example, nodes 202 and sections 203 can be powered on in sequence to identify the site or the nature of a fault. The bus 204 is reliable because the nodes 202 can monitor and detect bus conditions and configure their switches accordingly to maintain communication over the bus 204 in the presence of a fault.

Each node 202 in the intelligent tool bus network includes a first bus switch (SA) 208 and a second bus switch (SB) 209 that are connected in series and that are each electronically configurable in an open/closed position. The bus switches 208 and 209 are arranged in series with the bus sections 203 and with each other. The state of the switches 208 and 209 therefore determines the transmission of signals through the node and along the bus. For example, bus signals may pass through the node when both SA 208 and SB 209 are in a closed position.

Each node 202 also includes a terminator switch (SC) 210 electrically connected to a point between SA 208 and SB 209 and a terminator 205 (e.g., contained in the node). The terminator switch 210 in a node can be used to terminate the bus 204 by closing SC 210. For example, if SA 208 is closed and SB 209 is open then SC 210 is closed to prevent reflections on the bus 204 that would otherwise be caused by the opened SB 209.

Each node 202 also includes a tool switch (SD) 211 electrically connected to a point between SA 208 and SB 209 and tool 212. The tool switch 211 attaches/detaches the tool 212 to/from the bus 204 when it is closed/open.

The state of the four switches (i.e., SA, SB, SC, and SD) in each node 202 can be based on rules. For example, the SC 210 closes if one of the bus switches SA 208 and SB 209 are open to have the bus 204 always properly terminated. As shown in FIG. 2, Node 1 and Node N are located at the two endpoints of the bus 204. Accordingly, each endpoint node has one closed bus switch (i.e., SB 209 in the Node 1 and SA 208 in the Node N, respectively) and a closed terminator switch. To detach Node 1 from the bus and make Node 2 the endpoint, SA 208 of Node 2 is opened. The opening of SA 208 causes the terminator switch SC 210 of Node 2 to close, thereby terminating the bus 204 automatically.

A tool switch SD 211 of a node 202 is open/closed to attach/detach one (or more) tool 212 to the bus 204. A tool 212 may be attached to the bus 204 (i.e., SD closed) if the node 202 is located at an endpoint of the bus (i.e., SA or SB open) or if the node 202 is located along the bus (i.e., SA and SB closed). As shown in FIG. 2, intermediate nodes 2 to N−1 each have closed switches SA, SB, and SD so that the node 202 passes bus signals and so that a tool 212 connected to the node is attached to the bus. The intermediate nodes 2 to N−1 each have opened terminator switches 210 to avoid terminating the bus at an intermediate point.

One or more nodes 202 may be selected to communicate with the surface 107 via their own telemetry 106. As shown in FIG. 2, Node 4 is selected to communicate to the surface 107 via telemetry 106. This selection may be dynamic. Accordingly, if the intelligent tool bus network is reconfigured, different nodes 202 may be selected to communicate with the surface 107.

Node Embodiment

Figure 3:
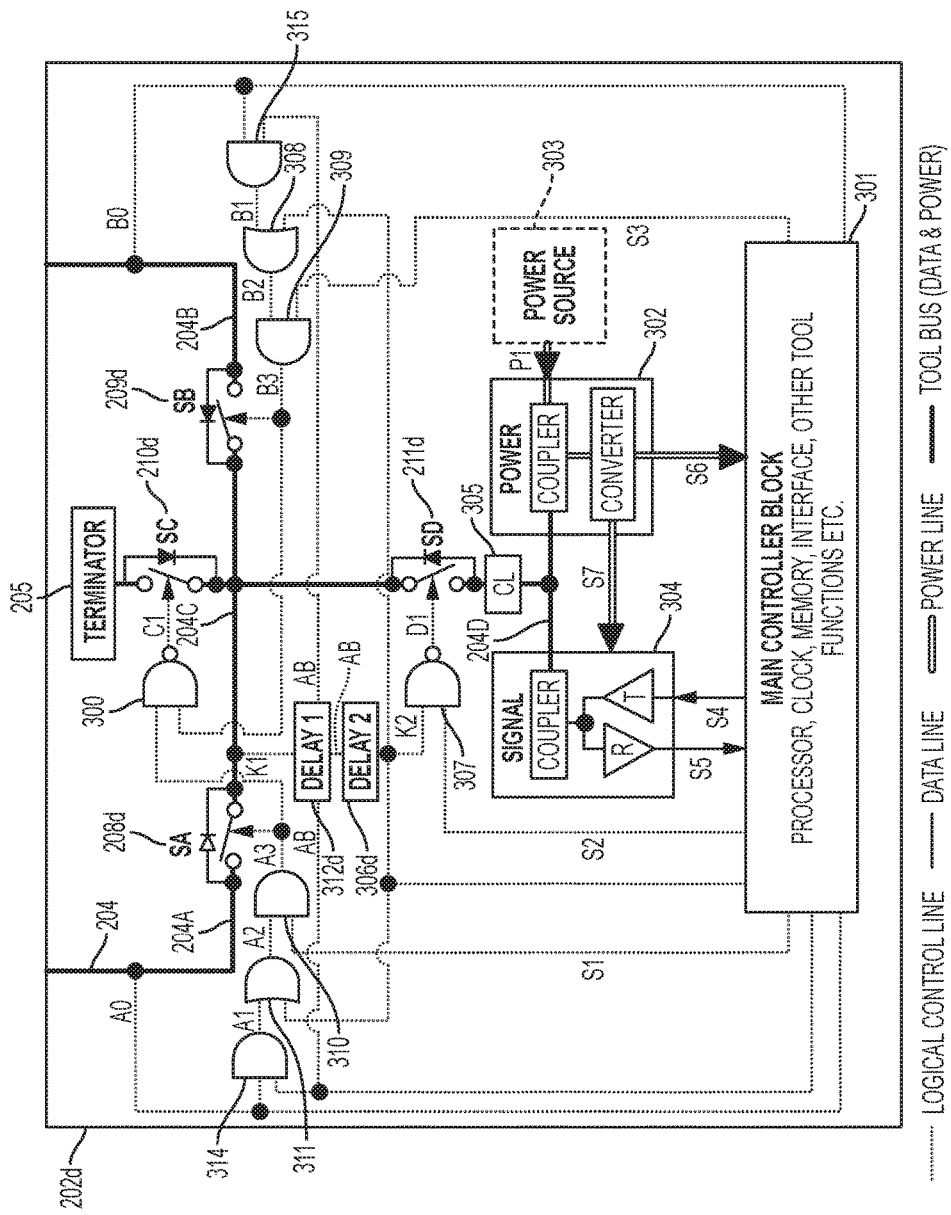
FIG. 3 is a schematic diagram of a node for the intelligent tool bus network for the BHA.

FIG. 3 is a schematic diagram of an embodiment of a node 202 for the intelligent tool bus network 200.

In the FIG. 3, the tool bus 204 inside the node is divided into three sections 204A, 204B, 204C by two bus switches SA 208*d* and SB 209*d*. Section 204A is between a first side of the bus switch SA 208*d* and a first adjacent node. Section 204C is between a second side of the bus switch SA 208*d* and a first side of the bus switch SB 209*d*. Section 204B is between a second side of the bus switch SB 209*d* and a second adjacent node. The terminator switch SC 210*d* is used to connect or disconnect the terminator 205 from the section 204C. The tool switch SD 211*d* is used to connect or disconnect tool electronics from the section 204C. A current limiter CL 305 is in series with the tool switch SD 211*d* and is used to limit the current, which passes through the tool switch SD 211*d*. The section 204D is derived from the CL 305 and connected to a signal block 304 and a power block 302.

The signal block 304 is coupled to the section 204D through an internal signal coupler. In a receiving mode, the data signal is extracted by the internal receiver and forwarded to a main controller block 301 through the signal line S5. In transmitting mode, the data is received from the main controller block 301 through the signal line S4 and put on the section 204D by the internal transmitter via the signal coupler. The transmitter of the signal block 304 should appear to be high impedance when not in transmitting mode. Otherwise, it can disrupt the transmitter of other nodes from operating properly. The AC short-circuit failure occurs if the transmitter appears to be low impedance when not in transmitting mode. In the event of AC short circuit, the signal block 304 should be disconnected from the bus 204.

The power block 302 is coupled to the section 204D through one power coupler. The power block 302 may also receive the electrical power from the power source 303 via a powering line P1. The power source 303 typically derives from lithium batteries, downhole alternator, power supply or their combination. The power source 303 can be used to power the other nodes or exclusively itself. Usually, the power block 302 has the internal converter to regulate the received power into the voltage levels suitable for its local needs, such as the powering line S7 to the signal block 304 and powering line S6 to the main controller block 301.

While the node of FIG. 3 is shown with a power source, one or more nodes of the intelligent tool bus network 200 may not have an internal power source 303. Instead, such nodes may be powered by power conveyed on the bus 204.

Herein, a coupler (power or signal) is defined to pass through signals of interest at a minimal insertion loss while blocking other signals at minimal loading effect (i.e. with a high apparent input impedance to other signals). A coupler differs from a filter in that the filter emphasizes the output characteristics instead of the input characteristics so that a filter may has a low apparent input impedance to other signals. Bus power in the downhole BHA 200 is typically DC. In case of AC power used, it must use a frequency band different from that of bus signal.

While the four switches SA 208d, SB 209d, SC 210d and SD 211d are shown as unidirectional switches (e.g., MOS-FET switches), any one or more of the four switches may be implemented as a combination of two unidirectional switches in a back-to-back or head-to-head configuration, or a bidirectional switch.

The switches SA 208d, SB 209d, SC 210d and SD 211d close when the logical control line A3, B3, C1 and D1 is logically true (e.g., physically high), respectively. The line A3 is the logical AND 310 of the line A2 and the line S1. That is, the line A3 is true only if both the line A2 and the line S1 are true. The line A2 is the logical OR 311 of the line A1 and the line K2. That is, the line A2 is true if either or both of the line A1 and the line K2 are true. The line A1 is the logical AND 314 of the line A0 and the line AB. That is, the line A1 is true only if both the line A0 and the line AB are true.

A Delay1 312d and a Delay2 306d create a delayed response to their respective inputs. For example, when line K1 turns true an input of the Delay1 312d turns true. An output of Delay1 312d remains false (e.g., physically low) at this time. After a first predetermined delay period, the output of Delay1 312d turns true, thereby making line AB turn true. Likewise, when line AB turns true, an input of the Delay2 306d turns true. An output of Delay2 306d remains false at this time. After a second predetermined delay period, the output of Delay2 306d turns true, thereby making line K2 turn true. The first predetermined delay period of Delay1 312d is less than, equal to, or greater than the second predetermined delay period of Delay2 306d, and vice versa.

Line AB turns true the first predetermined delay period of the Delay1 312d after the line K1 turns true. The line A0 and the line K1 turn true once the voltage of the section 204A goes into the defined or expected range, which is typically the voltage range of operating DC power. That is, because the bus switch 208d is a unidirectional switch voltage is passed from bus section 204A to bus section 204C once the voltage is applied to the bus section 204A. As shown in FIG. 3, the bus switch 208d is forward biased from bus section 204A to bus section 204C. Similarly, the line K2 turns true the second predetermined delay period of the Delay2 306d after the line AB turns true.

The line B3 is the logical AND 309 of the line B2 and the line S3. That is, the line B3 is true only if both the line B2 and the line S3 are true. The line B2 is the logical OR 308 of the line B1 and the line K2. That is, the line B2 is true if both or either of the line B1 and the line K2 are true. The line B1 is the logical AND 315 of the line B0 and the line AB. That is, the line B1 is true only if both the line B0 and the line AB are true.

The line B0 and the line K1 turn true once the voltage of the section 204B goes into the defined or expected range, which is typically the voltage range of operating DC power. That is, because the bus switch 209d is a unidirectional switch, voltage is passed from bus section 204B to bus section 204C once the voltage is applied to the bus section 204B. As shown in FIG. 3, the bus switch 209d is forward biased from bus section 204B to bus section 204C.

The line C1 is the logical NAND 300 of the line A3 and the line B3. That is, the line C1 is false only if both the line A3 and the line B3 are true. The line D1 is the logical NAND 307 of the line K2 and the line S2. That is, the line D1 is false only if both the line K2 and the line S2 are true.

The line S1, S2 and S3 are secured-low control lines from the main controller block 301. That is, each of the lines S1, S2, and S3 issue a true signal (e.g., physically high) in a default state. In a secured state, each of lines S1, S2, and S3 issue a false signal (e.g., physically low). Each of lines S1, S2, and S3 are independently controlled by the main controller block 301. The line A0, A1, B0, B1 and K2 feedback to the main controller block 301 with the bus states.

The secured-low control lines may be implemented as described in application Ser. No. 15/893,225, entitled "Reconfigurable Tool Bus Network For A Bottom Hole Assembly," filed on Feb. 9, 2018, which is hereby incorporated by reference in its entirety. For example, each secured-low control line can be implemented through a secured control line circuit (not shown). The secured control line circuit can include an AC-coupled rectification circuit configured to issue the secured state in response to receiving a pulse train and otherwise issue the default state. The main controller block 301 issues the pulse train in response to running a self-diagnostic test for a fault. That is, the main controller block 301 provides the pulse train to the AC-coupled rectification circuit as long as a fault is not detected.

The AC-coupled rectification circuit is configured to pass an AC component of the pulse train to a rectification circuit to generate a stable high voltage level. The AC-coupled rectification circuit is also configured to block DC signals from being passed to the rectification circuit.

The secured control line circuit can further include a voltage inversion circuit connected to an output of the rectification circuit, wherein the inversion circuit generates a voltage for the secured-low control lines. That is, as long as the pulse train is received, the rectification circuit produces a stable high voltage value and the inversion circuit produces a stable low voltage value for the secured state. If the pulse train is not received, the rectification circuit produces a stable low voltage value and the inversion circuit produces a stable high voltage for the default state.

Other node configurations may be used in the various embodiments of the disclosure, such as those disclosed in application Ser. No. 15/893,225, entitled "Reconfigurable Tool Bus Network For A Bottom Hole Assembly," filed on Feb. 9, 2018, which is hereby incorporated by reference in its entirety. For simplicity, in what follows, the operation of the intelligent tool bus network 200 is described with respect to the node embodiment shown in FIG. 3. However, it should be understood that equivalent operations can be performed using other node embodiments.

By virtue of the logical equivalence law there are other node embodiments (i.e., with different logic circuits) that can operate as the embodiment presented thus far. Regardless of the implementation, each of the nodes 202 use controllable switches to power various parts (bus sections 203) of the bus system 204 independently or in sequence so that each portion can be separately diagnosed or particular application needs can be met.

Time-domain multiplexing (TDM) is often used for downhole tool string applications due to its simplicity and ruggedness. Among TDM schemes, bus mastering is a dominant industry practice today, in which the bus uses one bus master node to control the bus access from other slave nodes. Hence, there is no risk of bus access contention which significantly simplifies the node implementation despite that the bus is vulnerable to the master node failure.

Other TDM schemes may be used. For example, a token passing scheme is also used that creates a bus network of equal nodes, which may continue working no matter which node fails. Despite its higher fault tolerance, token passing schemes however required rather complex token management and also have a lower channel efficiency. Certainly, there are many other TDM schemes and channel access methods which may be used. Other communication schemes may be used, such as frequency-division multiplexing, code-division multiplexing, and the like without departing from the spirit and scope of the pending disclosure.

Bus Enumeration

Enumeration is a process of detecting, identifying and diagnosing the nodes connected and the problems existing in the tool string together with automatically corrective actions. A node 202 on the bus 204 can be either a "slave" or a "master" depending on whether it can enumerate the tool bus. A slave node cannot initiate a bus enumeration and typically does not has its own power source 303. A master node or enumerating master node (EMN) can initiate an enumeration and has its own power source 303. Once the EMN completes a bus enumeration and the bus health is confirmed good for communication, the EMN may release the bus control for other nodes 202 on the bus 204 in accordance with the specific channel access method used. Upon completion of the enumeration, the EMN will generate a tool string layout map that includes the information of each node 202 on the bus 204, their relative location in the tool bus 204, and their operating status (e.g., type of fault or good operating status).

The EMN has its own power source 303 adequate for powering the bus during the enumeration, and may continue powering the bus and/or use power sourced from other nodes after the enumeration. The EMN has four operating states, i.e. "Sleep", "Standby", "Deputy", and "Active". The EMN can assume only one state at a time, but can transition to other states at particular events which are described in more detail below.

In an "Active" state, the EMN can initiate an enumeration upon detecting an abnormal bus condition or upon receiving a request. The request to initiate an enumeration may be received from another bus node 202 on the bus 204 or through a command from an external device, like the surface controller 107, an external PC used for testing the tool string at the surface, etc.

In a "Standby" state, the EMN cannot initiate an enumeration, but continually monitors the bus activity for any sectioning events. Upon detecting a bus sectioning event, the EMN automatically promotes itself to the "Deputy" state. In the "Deputy" state, the EMN can initiate an enumeration on a sub-bus (e.g., a portion of the bus 204 that comprises a sub-set of the nodes 202). A bus sectioning event may occur upon a fault on the bus 204, such as upon the EMN in the "Standby" state detecting a loss of power or bus activity on the bus 204. A bus sectioning event may also occur upon receiving an instruction, as described in more detail below. The EMN node in the "Deputy" state may transition back to the "Standby" state upon re-joining with the bus 204.

In a "Sleep" state, the EMN cannot initiate an enumeration and may not monitor the bus 204 for activity. In the "Sleep" state, the EMN behaves substantially similar to a "Slave" node.

An EMN may transition its state among "Sleep", "Standby" and "Active" upon receiving an instruction from the external device, such as from the surface controller 107 via telemetry 106 or from another bus node 202 on the bus 204. An EMN can only enter the "Deputy" state from the "Standby" state upon a bus sectioning event, and may enter one of the "Sleep", "Standby" and "Active" states from the "Deputy" state upon re-joining with the bus 204, although it preferably returns to the "Standby" state.

To simplify the illustration of principles and methods of the disclosure, only a bus mastering scheme is discussed using the tool bus network 200 in FIG. 2 with the node 202d embodiment in the FIG. 3. It is further assumed that the Node 4 in FIG. 2 is elected as the "Active" EMN and the bus master node. However, it should be understood that this does not imply any limitations or constraints with the principles and methods disclosed herein. Other bus multiplexing schemes may be used with other node embodiments on other tool bus networks without departing from the spirit and scope of the disclosure.

In the bus mastering scheme, the tool bus 204 may not have more than one EMN in the "Active" or "Deputy" state at a time, but must have at least one EMN in the "Active" or "Deputy" state. Additionally, the tool bus 204 may include zero, one, or multiple slave nodes and/or EMNs in the "Sleep" or "Standby" state at a time. If the tool bus 204 is divided into multiple independent sub-buses either due to fault conditions or planned section-division multiplexing, each independent sub-bus will operate as a new tool bus.

In FIG. 2, all of the EMN nodes 202 in the tool bus network 200 may initially be in the "Sleep" state or have been properly configured to other states when they are conveyed downhole. Preferably, the "Sleep" state is selected for all the EMN nodes to save on power consumption before downhole operation starts, and all slave nodes 202 are in an un-powered state. To start the downhole operation, the surface controller 107 may send a command via telemetry 106 to the Node 4 to transition to the "Active" EMN state if it is not already in the "Active" state and initiate an enumeration of the tool bus network 200.

Enumerating Sequence

Figure 4:
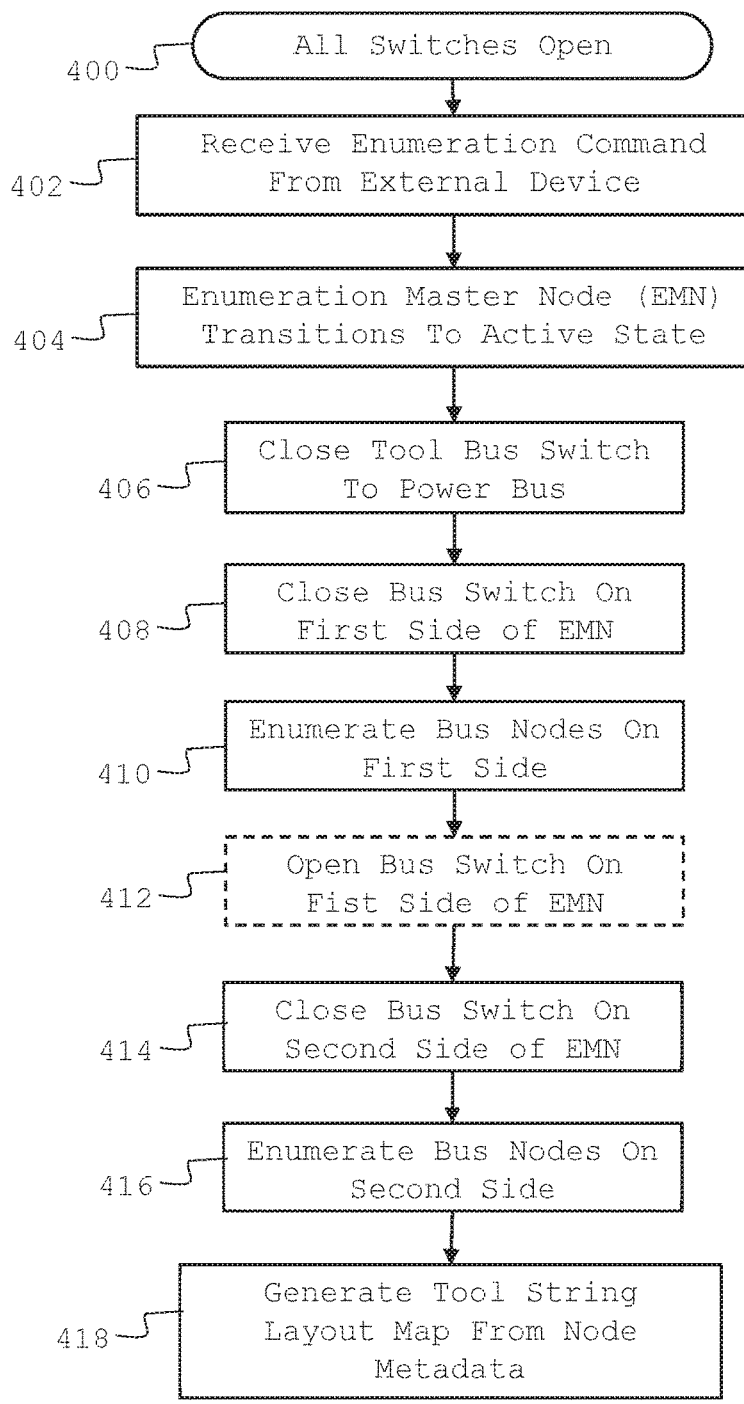
FIG. 4 is a flow chart for enumerating the intelligent tool bus network.

FIG. 4 is a flow chart for enumerating the intelligent tool bus network. Initially, all switches are open (block 400). The Node 4 receives a command from the surface controller 107 via the telemetry 106 (block 402). The command instructs the Node 4 to transition to the "Active" state (block 404). Upon transitioning to the "Active" state, the EMN Node 4 closes its tool switch SD 211 and its bus switch SA 208 to power on the first bus section at its left side which is connecting to the Node 3 (block 406).

For example, with reference to the node embodiment shown in FIG. 3, the EMN Node 4 sets the line S2 to the low state to close its tool switch 211d. For example, the main controller block 301 issues the pulse train to AC-coupled rectification circuit of the secured control-line circuit, which in turn generates a high state that is fed into the voltage inverter circuit. The voltage inverter circuit issues the secured-low state on line S2. Other methods of setting the line S2 to the low state may be used. The bus 204 is un-powered at this point, therefore, the line K2 is likewise in its default low state. The line D1 turns high as it is the logical NAND 307 of the line K2 in the default low state and the line S2 in the secured-low state. Accordingly, the tool switch SD 211d closes and the bus section 204C is powered on by the power source 303 conducting its power to the bus section 204C.

Upon detecting the voltage on the line 204C, the line K1 turns high and the Delay1 312d starts running which preferably lasts 5~10 milliseconds. The line AB turns high once the Delay1 312d elapses. The line A1 remains low as it is the logical AND of line A0 in its default low state and line AB in the high state. Likewise, the line B1 remains low as it is the logical AND of line B0 in its default low state and line AB in the high state.

Upon the line AB turning high, the Delay2 306d starts running, which preferably lasts 30~100 milliseconds. The line K2 turns high once the Delay2 306d elapses. Therefore, the line B2 turns high as it is the logical OR 308 of the line B1 in the default low state and the line K2 in the high state. Similarly, the line A2 turns high as it is the logical OR 311 of the line A1 in the default low state and the line K2 in the high state. As described above, lines S1 and S3 are secured-low control lines with a default high state.

So as to not allow both bus switches SA 208d and SB 209d to close at the same time, the EMN Node 4 maintains the line S1 at the default high state while issuing the controlled state on line S3 in the secured-low state. Therefore, the line B3 remains at the low state as it is the logical AND 309 of lines B2 in the high state and S3 in the secured-low state. Consequently, the bus switch SB 209d remains open. Likewise, the line A3 turns high as it is the logical AND 310 of line A2 in the high state and line S1 in the default high state. Consequently, the bus switch SA 208d closes to enumerate the bus 204 to the left of Node 4 first (block 408). While described herein by enumerating the bus 204 to the left first, the Node 4 may enumerate the right side of the bus 204 first in some implementations.

Because the bus switch SA 208d closes while the bus switch SB 209d remains open, the terminator switch SC 210d automatically closes as the line C1 is the logical NAND 300 of the line A3 in the high state and the line B3 in the low state. Thereby, the powered bus section is terminated at the first endpoint at Node 4 with the terminator 205.

The Node 4 proceeds with enumerating the first side of the bus 204 to the left of Node 4 as described in more detail below with reference to FIG. 5 (block 410). For each node which is able to communicate with the bus 204 on the first side of the bus 204, the Node 4 reads out its node ID and metadata to generate an entry in an enumeration log. The node metadata includes a tool type, operating characteristics, and requirements, etc., for a respective node. For each node that has any fault(s) and is not able to communicated with the bus 204, and which will automatically disconnect itself from the bus 204 by opening its respective tool switch SD 211d, the Node 4 also generates an entry with detailed diagnosis data in the enumeration log.

The EMN Node 4 checks whether the second side of the bus 204 has been enumerated when it finishes enumerating the first side of the bus 204. If the second side has not been enumerated, the EMN Node 4 may open the bus switch SA 208d to disconnect the first side of the bus 204 so that the enumeration on the second side is not disturbed (block 412). Although it may enumerate the second side without disconnecting the first side in some case, disconnecting the first side of the bus 204 is especially useful when the last node on the first side is problematic and does not connect its terminator to the bus 204. By disconnecting the first side of the bus 204, the EMN Node 4 will automatically connect its terminator to the bus 204 to ensure that the second side of the bus 204 is properly terminated during the enumeration. Generally, it is preferred for the EMN Node 4 open the bus switch SA 208d before closing the bus switch SB 209d to enumerate the second side of the bus 204.

The Node 4 opens the bus switch SA 208d by changing the state of the secured control line S1 to the secured low state. That is, the main controller block 301 of Node 4 changes the state of the secured control line S1. The line A3 turns low as it is the logical AND of line A2, which is high, and line S1, which is now low. Line A3 turning low opens the switch SA 208d.

The Node 4 closes the bus switch SB 209d to enumerate the bus 204 to the right of Node 4 second (block 414). The Node 4 closes the bus switch SB 209d by changing the state of the secured control line S3 to the default high state. The line B3 turns high as it is the logical AND of line B2, which is high, and line S3, which is now high. Line B3 turning high closes the bus switch SB 209d. Because the bus switch SA 208d is open and the bus switch 209d is closed, the terminator switch SC 210d remains closed to connect the terminator 205 to the bus 204 at Node 4. The Node 4 proceeds with enumerating the second side of the bus 204 to the right of Node 4 as described in more detail below with reference to FIG. 5 (block 416).

Finally, the complete tool string layout map which includes the information of each node and their relative location in the tool bus is generated (block 418). The generated layout map and the enumeration log provide valuable information of the tool string operating status. The generated layout map can be compared with known tool string layouts or previously generated ones. If any discrepancy exists, the enumeration log can be analysed to identify the problematic sites and the fault types. Therefrom, the underlying causes and weakness can be disclosed for efficient tool troubleshooting and further design improvement. Once the tool string map is generated, the whole tool string can be powered on with a power-on sequence detailed in later paragraphs to start normal operation.

Figure 5:
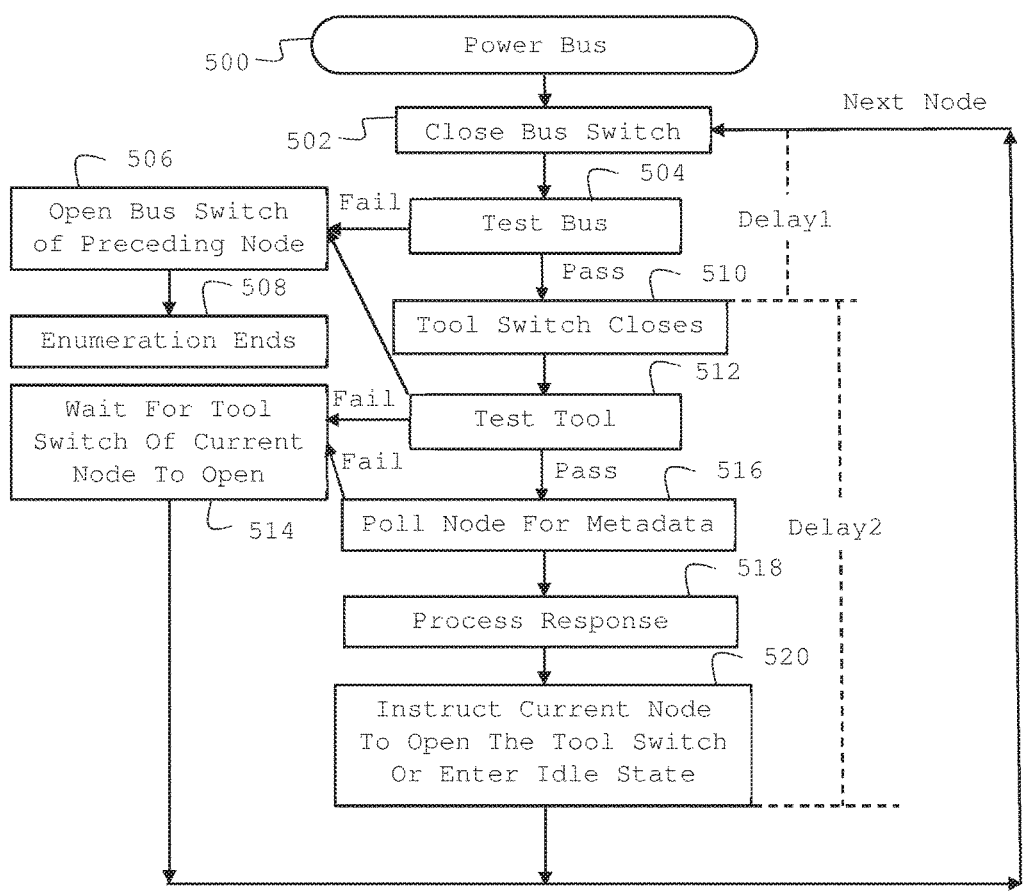
FIG. 5 is a flow chart illustrating an example tool string enumeration for one side of the intelligent tool bus network.

FIG. 5 is a flow chart illustrating an example tool string enumeration for one side of the intelligent tool bus network. For illustrative purposes only, the description of FIG. 5 is made from the perspective of enumerating the left side of the bus 204 from Node 4, though the description equally applies for enumerating the right side of the bus 204 from Node 4. The flow chart shown in FIG. 5 is executed for each of blocks 410 and 416 described above.

Upon the Node 4 closing its bus switch SA 208d, the bus 204 to the left of Node 4 is powered thereby providing power to the bus section 204B of Node 3 (block 502). Therefore, the control line B0 of Node 3 turns high upon receiving the proper bus voltage from Node 4. By virtue of the nature of the unidirectional switch SB 209d, the body diode of the switch SB 209d passes power from the bus section 204B to the bus section 204C. Upon the control line K1 of Node 3 detecting the proper bus voltage, its Delay1 312d starts running which again preferably lasts 5~10 milliseconds. At this point, the bus switch SA 208*d*, the bus switch SB 209*d* and the tool switch SD 211*d* of Node 3 remain open.

The EMN Node 4 tests the powered bus section to verify proper condition of the bus before powering the tool electronics of Node 3 (block 504). The EMN Node 4 performs a current test where the EMN Node 4 senses the current drawn on the powered bus section, which is supposed to be about zero as the tool electronics of Node 3 are not yet connected. If the sensed current is higher than an expected value, it indicates that there is a leakage in the powered bus section. If the output current is high enough to trigger the current limiter CL 305 in the EMN Node 4, it indicates that there is a short circuit in the powered bus section. In either case, the EMN Node 4 determines that the powered bus section has failed the test. The EMN Node 4 instructs the preceding node to open its bus switch (block 504). In this case, Node 4 is the preceding node to Node 3, therefore, Node 4 opens its bus switch SA 208*d* by setting the line S1 to the low state to disconnect the faulty bus section (block 504). The EMN Node 4 stops enumerating to the left side of Node 4 and logs the results of the test in the enumeration log (block 506).

If the EMN Node 4 detects zero current, then the EMN Node 4 determines that the powered bus section has passed the current test and updates the enumeration log. Subsequently, the EMN Node 4 waits until the Delay1 312*d* has elapsed in Node 3.

Upon the Delay1 312*d* of Node 3 elapsing, the line AB turns high. Therefore, line B1 turns high as it is the logical AND 315 of line B0, which is high, and line AB, which is now high. Consequently, line B2 turns high as it is the logical OR 308 of lines B1, which is high, and line K2, which is at its default low value. Therefore, line B3 also turns high as it is the logical AND 309 of lines B2, which is now high, and line S3, which is a secured-low control line in its default high state. Accordingly, switch SB 209*d* closes.

At the same time, line A1 remains low as it is the logical AND of line A0, which is un-powered at this point and remains at its default low state, and line AB, which is high. Additionally, line A2 remains low as it is the logical OR 311 of line A1, which is low, and line K2, which is also low. Therefore, line A3 remains low as it is the logical AND 310 of line A2, which is low, and line S1, which is a secured-low control line in its default high state. Accordingly, switch SA 208*d* remains open and the body diode prevents power from passing to bus section 204A of Node 3.

Because the bus switch SB 209*d* is closed and the bus switch SA 208*d* is open, the terminator switch SC 210*d* of Node 3 closes to properly terminate the bus 204. Therefore, Node 4 is properly terminated at one end of the powered bus 204 and Node 3 is properly terminated at the other end of the powered bus 204. Specifically, as line B3 is high and line A3 is low, line C1 turns high as it is the logical NAND 300 of lines A3 and B3, thereby closing terminator switch SC 210*d* and connecting the terminator 205 of Node 3 to the bus 204.

Upon the line AB turning high, the Delay2 306*d* detects a proper voltage and starts running, which preferably lasts 30~100 milliseconds. At the same time, the Delay2 306*d* produces a default low state on the line K2. Therefore, line D1 turns high as it is the logical NAND 307 of the line K2 in the default low state and the line S2, which is a secured-low control line in the default high state. Accordingly, the tool switch SD 211*d* closes to power on the internal tool electronics of Node 3 (block 510).

Different scenarios may occur once the internal tool electronics are powered on in the Node 3. If the main controller block 301 is powered on and starts up correctly, it first runs the self-diagnostic program to check whether there are any severe faults which necessitate disconnection of the internal tool electronics from the bus immediately. If there are no such faults found, the main controller block 301 of Node 3 changes the secured control lines S1 and S2 from the default high state to the secured low state as described in the earlier paragraphs. This ensures that the tool switch SD 211*d* remains closed after Delay2 306*d*, if desired, and ensures that the bus switch SA 208*d* remains open so that other nodes on the bus are not connected until the enumeration of Node 3 is complete.

Specifically, the line A3 remains in the low state as it is the logical AND 310 of the line A2 and the line S1 in the low state. Therefore, the bus switch SA 208*d* remains open so that no power passes to the next bus section. Similarly, the line D1 remains in the high state as it is the logical NAND 307 of the line K2, which is currently low, and the line S2 in the secured-low state. The tool switch SD 211*d* remains close so that the internal tool electronics can be continuously powered. If severe faults are found, the main controller block 301 keeps the line S2 and the line S1 in the default high state to disconnect the tool electronics of Node 3 from the bus 204 and to power the next section of the bus 204. In either scenario, the main controller block 301 continues the self-diagnosis and adjusts the states of the line S2 and the line S1 accordingly in the repetitive manner while waiting for polling from the EMN Node 4.

If the main controller block 301 does not start up correctly, the line S2 and the line S1 also remain in the default high state. Once the Delay2 306*d* elapses, the line K2 turns high. If severe faults exist, the line S2 and the line S1 remain in the default high state. Therefore, the line A2 turns high as it is the logical OR 311 of the line A1 in the default low state and the line K2 in the high state. The line A3 turns high as it is the logical AND 310 of the line A2 in the high state and the line S1 in the default high state. The bus switch SA 208*d* closes to power on the next bus section to continue the enumeration process, which is connected to the Node 2 in the example shown in FIG. 2.

In either case, if the main controller block 301 is powered on and starts up correctly, but detects a fault, or if the main controller block 301 does not start up correctly, the EMN Node 4 waits for the tool switch SD 211*d* of the faulty node 3 to open before continuing the enumeration process on the next node (block 514). After the Delay2 306*d* elapses, line K2 turns high, which in turn causes the line D1 to turn low as it is the logical NAND 307 of the line S2 in the default high state and the line K2 in the high state. The tool switch SD 211*d* opens to disconnect the internal tool electronics of Node 3 from the bus 204 and the enumeration continues to the next node.

If no severe faults exist with the internal tool electronics of Node 3, as described above, the main controller block 310 of Node 3 sets both the line S2 and the line S1 to the secured-low state so that the bus switch SA 208*d* remains open and the tool switch SD 211*d* remains close. Communication between the Node 3 and the EMN Node 4 is then established.

The EMN Node 4 runs several tests once the internal tool electronics of the Node 3 are powered on but before the Delay2 306*d* elapses (block 512). One test is an AC impedance test where the EMN Node 4 issues an AC signal with its signal transmitter to the powered bus section. The AC signal has an appropriate frequency suitable for the channel characteristics, preferably the carrier frequency is used. In the simplest form, it can be a pulse train with a duty cycle of 50%. Because the powered bus section is loaded with terminators, the current consumption by the signal transmitter of the EMN Node 4 which is in turn fed to the bus terminator(s) is sensed, from which the EMN Node 4 measures the loading impedance.

The AC current consumption by the signal transmitter of the EMN Node 4 is different from the DC current drawn by the powered bus section, such as described above with reference to block 504 or the node current test described below. Although the AC current consumption results from the AC signal excited on the terminator(s), the AC current derives from the signal transmitter of the EMN Node 4 and is drawn from a DC power source which is powering the signal transmitter. Hence, the AC current consumption can be evaluated by measuring the DC current consumption by the signal transmitter of the EMN Node 4. The DC current measurement circuit (not shown) may be integrated into the signal block 304 in the node embodiment shown in FIG. 3, for example. Various DC current measurement circuits or IC (integrated circuit) chips can be used, which are well-known to one of ordinary skill in electronic circuits.

If the measured loading impedance from the AC impedance test is equal to one terminator value, it indicates that there is an open circuit, which may be due to a broken bus section or no bus node connected to the bus. The EMN Node 4 then opens its bus switch SA 208d and stops enumerating the left side of the bus 204 (blocks 506, 508).

If the measured loading impedance is close to zero, it indicates that there is an AC short circuit, which is usually caused by a fault in the transmitter in the connected Node 3. The EMN Node 4 waits until the Delay2 306d elapses as the faulty node will automatically break away from the bus as described previously (block 514). The EMN Node 4 then continues enumerating on the next bus section by looping back up to block 502.

If the measured loading impedance is equal to the half terminator value, it indicates that a node is connected as the terminators at the two endpoints are electrically in parallel which gives the half terminator value. The EMN Node 4 then continues to the next test of the connected Node 3 with the node current test.

The second test is the node current test where the EMN Node 4 senses the DC current drawn from its power source 303 by the powered bus section and the powered node. The node current test is measured directly by a bus current sensing circuit of the EMN Node 4. The bus current sensing circuit (not shown) may be integrated into the current limiter CL 305 in the node embodiment shown in FIG. 3. If a low loading current (e.g., ⅓-½ of the typical current consumption of one node) is measured, it indicates an open circuit, which is usually caused by faulty power converter in the connected Node 3. If a high loading current (e.g., 2-3 times of the typical current consumption of one node) is measured, it indicates a short circuit in the connected Node 3. The current limiters CL 305 in both the EMN Node 4 and the connected Node 3 are triggered to prevent further damages. In both cases, the EMN Node 4 determines that there is an abnormal node current and the enumeration log is updated. As above, the EMN Node 4 waits until the Delay2 306d elapses as the fault node will automatically break away from the bus (block 514).

If a proper loading current (e.g., ½-2 times the typical current consumption of one node) is measured, the EMN Node 4 then continues to a node status test before the Delay2 306d elapses. In the node status test, the EMN Node 4 attempts to poll the connected Node 3 (block 516). If the connected Node 3 does not respond, the EMN Node 4 waits until the Delay2 306d elapses as the faulty Node 3 will automatically break away from the bus as described previously (block 514).

If the connected Node 3 responds, the EMN Node 4 processes the response (block 518). From the response, the EMN Node 4 reads a node ID and node metadata of the connected Node 3, and updates the tool string layout map as described above in block 418. The node metadata typically include the tool type(s), operating characteristic(s) and requirement(s), etc. of the connected Node 3. From the response, the EMN Node 4 obtains the operating status of the connected Node 3, and sets a flag in the enumeration log accordingly. The flag can be used to determine whether to keep a node powered on or not in the normal operation. If the Node 3 responds that it is not operating properly, the Node 3 will be powered off in the power-on process and disconnected from the bus 204 in the normal operation. If the connected Node 3 responds that it is operating normally, the Node 3 can be powered on in the power-on process and connected to the bus 204 in the normal operation.

After processing the polling response from the connected Node 3, the EMN node instructs the connected Node 3 to close both the bus switches and open the tool switch SD 211d to break away from the bus so that the next bus section can be enumerated (block 520). Therefore, the Node 3 will set the control lines S1-S3 to their default high state.

The EMN Node 4 continues enumerating on the next bus section (block 504) after detecting the close of bus switches of previous Node 3 (block 502) either by requesting the previous Node 3 to close its bus switches (block 520) or by waiting until the Delay2 306d of the previous Node 3 elapses (block 514). An AC impedance test described in the block 512 may be done to detect the close of bus switches. As described before, the bus 204 is terminated at the two ends during the Delay2 306d. After the Delay2 306d elapses, both bus switches of previous Node 3 are closed. The terminator switch 210d turns off to disconnected the terminator 205 of the previous Node 3 from the bus 204 because the line C1 is the logical NAND of the line A3 in the high state and the line B3 in the high state. That is, the bus 204 is only terminated at one end by the EMN Node 4 during the Delay1 312d. Therefore, If the measured loading impedance from the AC impedance test is equal to one terminator value, it indicates that the bus switches of previous Node 3 have closed. Thereafter, the EMN Node 4 continues the test on the next bus section (block 504) and repeat the process in the FIG. 5 until the first side of bus is enumerated when a bus section is open, leaked or shorted.

Power on Sequence

A power-on sequence is used to power on a tool string sequentially using a known tool string layout map in accordance with a defined tool string configuration. The power-on sequence starts with the bus 204 powered off, and may start from the EMN node down a first side of the bus 204 and then run on the second side similar to the enumeration process, or run on both sides simultaneously. To power off the bus 204 which is currently powered on, the EMN Node 4 may request any node(s) that are powering the bus 204 to turns off their tool switch(s) 211d to disconnected their internal power source 303 from the bus 204. Then the EMN Node 4 may open its bus switches SA 208d and SB 209d to disconnect its internal power source 303 from the bus 204. It may take some time (typically 100~200 milliseconds) for the whole tool string to stabilize at the unpowered state. Once the whole tool string stabilizes at the unpowered state, the EMN Node 4 takes a similar sequence as the enumerating sequence described before to power on the bus 204. As the tool string has already been enumerated, diagnostic tests are not required. Hence, the power-on sequence has a simplified process.

The bus 204 is powered back on by the EMN Node 4 closing its bus switches sequentially or simultaneously, as noted above. For the good nodes which should be connected to the bus 204 in the defined tool string configuration, the tool switch SD 211*d* will close as described above to connect the good nodes to the bus 204. For the good nodes which should be disconnected from the bus 204 in the defined tool string configuration, the tool switch SD 211*d* will open as described above to disconnect the good nodes from the bus 204, and their bus switches SA 208*d* and SB 209*d* will close to connect the next nodes on the bus 204, as described above. For the bad nodes, their tool switch SD 211*d* will automatically open to disconnect the bad nodes from the bus. Also, the bus switches SA 208*d* and SB 209*d* on the bad nodes will automatically close to connect the next nodes on the bus 204, as described above. For the bad nodes that communicate with the EMN Node 4 that they are not operating properly, the EMN Node 4 instructs those bad nodes to open their tool switch SD 211*d*, as described above.

At the distal end of the bus 204, only good nodes keep one of their bus switches off to terminate the bus by default, while problematic nodes automatically close both of their bus switches after the Delay2. Therefore, if the tool string layout map indicates that a distal node is a bad node, the bus master (e.g., Node 4 in the examples provided herein) may instruct the node preceding the distal node to open its distal bus switch. For example, with reference to FIG. 2, if the Node 1 is determined to be a bad node, in order to properly terminate the bus 204, the bus master Node 4 will send an instruction to Node 2 to open its bus switch SA 208*d*. Accordingly, the terminator switch 210*d* of Node 2 will close to connect the terminator 205 to the distal end of the bus 204.

The bus master Node 4 can selectively turn on the whole tool bus or a partial tool bus on the fly. If a good node is not needed at a particular time, it can be disconnected from the bus 204 by the bus master Node 4 instructing the good node to turn off its tool switch. Later on, the good node can be reconnected to the tool bus by issuing a power-on process, described above. Hence, each good node can be dynamically connected or disconnected to the tool bus in operation.

Similar to the above, and different from the intermediary nodes, the two distal nodes can be selectively connected or disconnected from the tool bus by controlling the bus switch of the preceding nodes. By controlling the bus switch of the preceding nodes, the bus is ensured to be properly terminated, as described above.

In the enumeration example provided above with reference to FIG. 5, upon processing the response from the powered node, the EMN Node 4 instructs the powered node to open its tool switch in order to minimize the loading effect of nodes during the enumeration process. As a result, the power-on sequence described above is required to re-connect the desired tool electronics to the bus after each enumeration. Given that there is only one powered node being enumerated together with the EMN node connected to the bus at any one time during the enumeration, all the measurements of each test have little variation among each node. Therefrom, the EMN node can simply compare the measurements of AC impedance test and DC current tests to predefined values to determine the state of each node during the enumeration. This leads to a simple implementation but, it may take a longer amount of time due to the extra time required to execute the power-on sequence.

In other embodiments, the EMN node may simply put the enumerated nodes into a known "Idle" state rather than to power them off so that all the nodes can be woken up from the idle state and directly enter into the normal operation without the extra power-on sequence. In the known "Idle" state, the enumerated nodes should not disturb the enumeration on other nodes and preferably have their terminators disconnected from the bus and consume a stable amount of DC current. In some implementations, EMN nodes may use the "Sleep" state described above as the "Idle" state if no interference to the bus enumeration is caused.

When enumerating a new node, characteristic changes detected with the measurements can be used to determine the state of each node since that connected nodes in the known "Idle" state may cause the drift of absolute measurements. For example, for the test for the channel leakage or shortage (block 504), if all of the enumerated nodes which are already connected to the bus draw stable DC current from the bus, the measurement may look at the change in DC current before and after the bus section is powered on. This change in DC current is attributable to the DC current drawn by the newly powered bus section itself. Very low DC current increase from before the section is powered on proves a good bus section. Otherwise, a leaked or shorted bus section may be detected from abnormal changes in the DC current from before and after the section is powered on.

Similarly, for the AC impedance test the EMN Node 4 measures the DC current consumption by the signal transmitter in the signal block 304 of the EMN Node. An amount of increase of the current consumption rather than its absolute value can be used to determine whether a new node is connected to the bus considering that loading effect of enumerated nodes may change its absolute measurements. If the increase of the current consumption is noticed, further comparison can be made. If the increase of the current consumption approximates the current consumption by one terminator, this indicates that a new node is connected to the bus. If the increase of the current consumption is much more (e.g., 50%-80% more) than the current consumption by one terminator, this indicates that there is an AC short in the signal block 304 of the new node. If a change of current consumption is not noticed, this indicates that there is either a broken bus section or no new node.

If a new node is detected and the new node does not have an AC shortage in its signal block, the DC current consumption of the new node is measured in the node current test. If the enumerated node(s) which are already connected to the bus draw stable DC current from the bus, the measurement of the change in DC current before and after the new node is powered on is representative of the amount of DC current drawn by the new node itself. If the DC current change is either too high (e.g., 2-3 times of the typical current consumption of one node) or too low (e.g., ⅓-½ of the typical current consumption of one node), this indicates an abnormal node current consumption. Otherwise, the EMN Node 4 determines that the new node has a normal current consumption (e.g., ½-2 times the typical current consumption of one node).

The rest of the enumeration process described above remains the same. Upon completion of the enumeration process, the bus master Node 4 does not need to perform the power-on sequence. Instead, the bus master Node 4 may send instructions to the desired nodes to transition from the "Idle" state to a normal operation state. For example, other EMN nodes may be instructed to transition from the "Idle"

state to the "Standby" state. Other nodes, such as slave nodes, may transition from the "Idle" state to a normal operation state.

In some implementations, good nodes keep one of their bus switches off by default to terminate the bus and keep their tool switch on to connect to the bus by default. In other embodiments, it is possible that all nodes, regardless of whether they are good or faulty, turn on both of their bus switches and turn off their tool switches when the Delay2 306d elapses unless they are commanded to turn off one of their bus switches and turn on their tool switch. Keeping the bus switches on and tool switch off by default corresponds to the setup of secured control lines. That is, the node does not issue the secured state unless it is commanded to do so. This can simplify the node implementations to some degree. Especially, the self-diagnostic program running in the main controller block 301 which does not need to run the test on the signal block 304 since no secured states are issued without receiving a command from the bus. Actually, a successful command cycle with the EMN Node 4 verifies the functionality of the signal block 304 in the node being enumerated. In other words, the node with a faulty signal block 304 cannot process the command to turn off its bus switches because a successful command cycle typically comprises of at least one receiving and one acknowledging phase which requires both a good signal receiver and a good signal transmitter.

Bus Sectioning

Sectioning is a process of dividing a tool bus into multiple independently-operating sub-buses including the sections of the pre-divided bus. Bus sectioning may occur passively due to bus channel faults or actively for section-division multiplexing (SDM). If a pre-divided bus has only one node with the telemetry 106 to the surface 107, only the sub-bus inheriting such node continues real-time communication with the surface 107, and the other sub-buses operate in a limp mode, in which a sub-bus cannot real-time communicate with the surface 107. In a sub-bus, the nodes can communicate each other but cannot communicate with the nodes in other sub-buses. A tool bus or sub-bus must have at least one node with a power source 303 for the bus powering and must have either one active or deputy EMN, but not both. As aforementioned, an EMN has four operating states, "Sleep", "Standby", "Deputy", and "Active", and can assume only one state at any time. A tool bus or sub-bus may have none, one, or multiple "Sleep" EMNs and "Standby" EMNs. A "Standby" EMN can automatically promote itself to the "Deputy" state in case of bus sectioning event to initiate an enumeration.

In the bus mastering scheme, multiple "Standby" EMN nodes may enter into the "Deputy" state to start a bus enumeration on a sub-bus, but only one "Deputy" EMN can win and complete the enumeration process while the other "Deputy" EMNs will stop their enumerations and demote themselves back to the "Standby" state.

Figure 6:
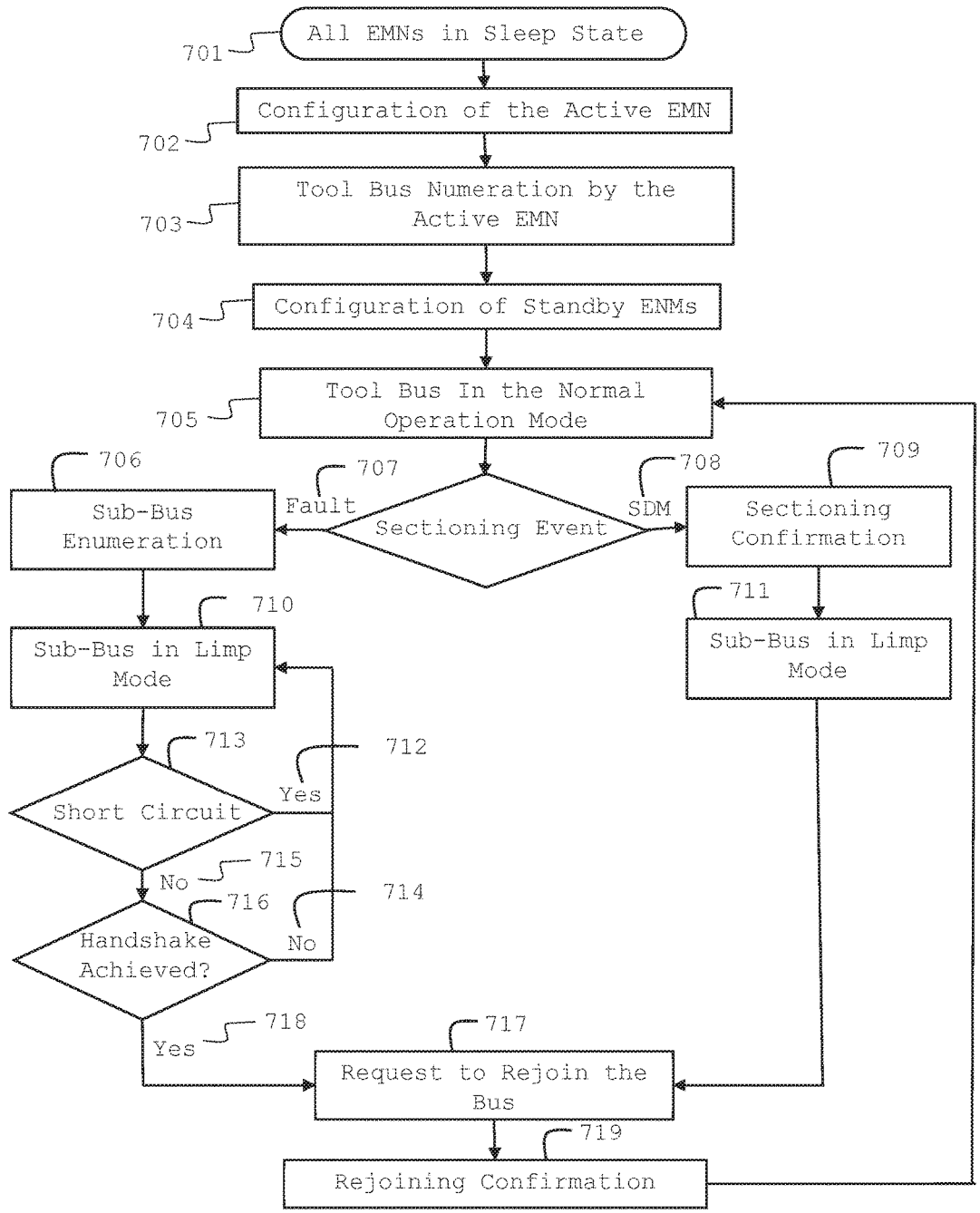
FIG. 6 is a flow chart illustrating an example bus sectioning of the intelligent tool bus network.

FIG. 6 is a flow chart illustrating an example bus sectioning of the intelligent tool bus network. Initially, all the EMNs are in "Sleep" mode before a job and there are no bus activities (block 701). To operate the tool string, one EMN is promoted to the "Active" state from the "Sleep" state (block 702). For example, as described above, the EMN Node 4 may receive an instruction from a computer on the surface 107 via the telemetry 106. The EMN that is promoted to the "Active" state may have a pre-stored known tool string layout map, a previously generated tool string layout map, or receive in the instruction a known tool string layout map. The "Active" EMN starts a bus enumeration, such as described above with reference to FIGS. 4 and 5, and generates a current tool string layout map (block 703). The "Active" EMN may compare the current tool string layout map with the known or previously generated tool string layout map to identify whether there are any problems in the tool string. In some implementations, the "Active" EMN will then implement the power-on sequence described above to power on the tool bus.

The "Active" EMN may configure some other EMNs in the tool string to be promoted from the "Sleep" state to the "Standby" state (block 704). For example, the "Active" EMN may send an instruction to each additional EMN in the tool string that is to be promoted to the "Standby" state. The "Standby" EMNs won't start any bus enumeration because the bus has been powered and operates normally (block 703). Meanwhile, the "Standby" EMNs are also configured by the "Active" EMN with corresponding response plans for a potential bus sectioning event (block 704). The bus then starts the normal operation (block 705).

Fault Segmentation

In the case of a bus fault, the "Active" EMN detects or is notified of the bus fault so that the "Active" EMN may perform an enumeration to locate the problematic section of the bus. When the fault arises from node electronics, the problematic node(s) will automatically break away from the bus and no bus sectioning will occur. When the fault arises from the bus channel, a channel short circuit will trigger the current limiter CL 305 in the node which is powering the bus, while a channel open circuit will disconnect a bus terminator, which disrupts the bus communication. In both cases, the "Active" EMN can detect the fault and sever the bus at the problematic section.

Therefrom, two new sub-buses are generated. One sub-bus has the "Active" EMN, called the mother sub-bus, and continues operating normally. The other sub-bus, called the daughter sub-bus, undergoes the loss of bus power or bus activity. If the daughter sub-bus includes a "Standby" EMN, the "Standby" EMN can promote itself into the "Deputy" state and start a bus enumeration of the daughter sub-bus. The "Deputy" EMN may start the enumeration either immediately upon detecting the bus sectioning event (e.g., the loss of bus power or bus activity) or wait for a predefined duration prior to initiating the enumeration of the daughter sub-bus. If the daughter sub-bus includes more than one "Standby" EMN, all "Standby" EMNs may enter into the "Deputy" state and start the enumeration of the daughter sub-bus simultaneously.

Channel access contention occurs when more than one "Deputy" EMN is accessing the same channel at the same time. If the bus is capable of resolving such contention (e.g., a CAN bus), the multiple "Deputy" EMNs can resolve the access contention automatically and only the winning "Deputy" EMN remains in that state and completes the enumeration of the daughter sub-bus. The other "Deputy" EMNs demote themselves back to the "Standby" state.

If the bus is intolerant to channel access contention (e.g., RS485, MIL-STD-1553, etc.) different schemes can be used to avoid contention. One preferable scheme is to use the time delay. Each "Standby" EMN is preloaded with different delays, for example, when the "Active" EMN promotes the EMN from the "Sleep" to the "Standby" state. The delay gets longer farther away from the "Active" EMN node. Therefore, upon detecting a sectioning event, the "Standby"

EMN will only promote itself to the "Deputy" state to initiate a bus enumeration of the daughter sub-bus after its preloaded delay from detection of the bus sectioning event. Therefore, "Standby" EMNs can enter into the "Deputy" state and initiate their enumerations one by one, but not at the same time if the duration of the delays of each "Standby" EMNs are properly chosen. The "Deputy" EMN with the shortest delay can disable other "Standby" EMNs from entering into the "Deputy" state by powering the bus and preventing channel access contention.

Another scheme to avoid channel access contention is to use varying bus voltages. Each "Standby" EMN is equipped with a power source which has a different voltage from the other EMNs in the tool string. The "Deputy" EMNs stop their enumeration and demote themselves back to the standby state when they detect another ongoing enumeration with a higher priority. The detection of another ongoing enumeration can be done with the lower-voltage EMN detecting the voltage of the higher-voltage EMN and the higher-voltage EMN detecting its own current drawn by the lower-voltage EMN. A higher priority may give to the "Standby" EMN with a higher bus voltage or a lower bus voltage. Therefore, only the "Deputy" EMN with the highest priority completes the enumeration of the daughter sub-bus. Certainly, other schemes can be used.

Once the daughter sub-bus is enumerated and terminated properly, it enters into a limp mode unless it can access an additional telemetry node (block 710). The daughter sub-bus then executes the fault response plan configured by the "Active" EMN and continues logging, measurement, and other suitable operations. Therefore, the consequences of the fault are mitigated.

The fault response plan for the daughter sub-bus may include trying to re-join the mother sub-bus because the channel fault may recover automatically in the ever-changing downhole environments. Both the mother and daughter sub-buses first run the channel leakage test on the faulty section as described above (block 504) by closing the bus switches connected to the faulty section for a short period (block 713). If short-circuit is detected (line 712), the daughter sub-bus resumes the limp mode (block 710) while the mother sub-bus resumes the normal mode. If short-circuit is not detected (line 705), both the new sub-buses continue the open circuit test or handshaking test (block 716). In the test, both the mother and daughter sub-buses repetitively close and open the bus switches connected to the faulty section for a short period to place a handshaking signal in the faulty section (block 716).

If the two sub-buses have the same operating voltage, each of the two sub-buses only senses the voltage on the faulty section when its own bus switch is opened so that it senses the signal from the other sub-bus. If the switching patterns are different, the two sub-buses can detect the handshaking signal from the other when the open-circuit fault is removed (line 718).

If the two sub-buses use different operating voltages, the handshaking test (block 716) can be done in a simpler way. The handshaking is detected (line 718) when the lower-voltage sub-bus detects the voltage of the higher-voltage sub-bus, while the higher-voltage sub-bus detects its own current drawn by the lower-voltage sub-bus. In the case, different pulse patterns are unnecessary.

Upon detecting the handshaking signal from the mother sub-bus, the daughter sub-bus exits from the limp mode and requests to re-join the mother sub-bus by closing its bus switch connected to the faulty section for a long duration which is adequate for the other sub-bus to detect it (e.g., 100-300 milliseconds) (block 717). The mother sub-bus also closes its bus switch to re-join the bus once it detects the voltage of the daughter sub-bus from the daughter sub-bus holding its bus switch closed on the faulty section (block 719). Thereafter, the two sub-buses re-join together and then the tool string resumes as a single bus (block 705). If the handshaking signal is not detected, the daughter sub-bus resumes the limp mode and repeats the process at a later time (line 714).

For example, it is assumed that a fault happens at the Joint 2 in the FIG. 2. It is further assumed that the Node 4 is the "Active" EMN and the Node 1 has been preselected as a "Standby" EMN. Upon detecting the channel fault in the bus section that includes the Joint 2, the "Active" EMN Node 4 opens its bus switch SA 208 to disconnect the problematic section and connects its terminator to the mother sub-bus, which includes the Nodes 4-N. The mother sub-bus then resumes operation normally since the EMN Node 4 has the telemetry 106 to the surface 107.

At the same time, the daughter sub-bus, including the Nodes 1-3, lost the bus power. Upon detecting the power loss, the "Standby" EMN Node 1 promotes itself to the "Deputy" state and starts a bus enumeration of the daughter sub-bus after the preloaded delay, if any, has elapsed. As part of enumeration process, the "Deputy" EMN Node 1 connects its terminator 205 to the daughter sub-bus, as described above. Also, because the EMN Node 1 was already a terminating node, the terminator 205 was already connected to the bus at that node. The daughter sub-bus opens the bus switch SB 209 in the Node 3 as a result of detecting the fault as part of the enumeration. Meanwhile, the terminator 205 in the Node 3 is connected to the daughter sub-bus. Once terminated properly, the daughter sub-bus enters into the limp mode.

The fault at the Joint 2 may go away sometime later. Both the sub-buses may run the tests on the faulty section to detect when the fault at the Joint 2 goes away. First, both the sub-buses repeatedly run the short-circuit test on the faulty section that includes the Joint 2, until no more short circuit is detected. Then both sub-buses initiate their own handshaking request by opening/closing the bus switches connected to the faulty section, i.e., the bus switch SB 209 in the Node 3 and the bus switch SA 208 in the Node 4. As a result, each sub-bus place a handshaking signal in the faulty section.

Meanwhile, each sub-bus keeps detecting the bus voltage only when its bus switch is open in order not to detect its own signal. The pulse pattern of the handshaking signal for the two sub-buses should be different if the same operating voltage is used in order to avoid any synchronous misdetection. It is preferred that the pulse frequency is different. If a proper handshaking signal is detected, this indicates that there is no more open-circuit condition. The daughter sub-bus, comprising the Nodes 1-3, exists from the limp mode and closes the bus switch SB 209 in the Node 3 for a long duration (e.g., 100-300 milliseconds) which is adequate for the other sub-bus to detect it. Meanwhile, the mother sub-bus, comprising the Nodes 4-N, also close the bus switch SA 208 in the Node 4 when it detects the bus voltage held on the previously faulty section by the daughter sub-bus maintaining its bus switch SB 209 in Node 3 closed. Thereafter, the "Active" EMN Node 4 runs the AC impedance test on the whole bus to confirm operation of the re-joined bus (block 719). Because the terminators 205 in the Node 3 and Node 4 are automatically disconnected when their bus switch SA 208 and SB 209 close, the re-joined bus will be terminated properly and the normal bus activity can be resumed (block 705).

Section Division Multiplexing (SDM) Segmentation

In the case of the SDM, the "Active" EMN first defines the layout of the new daughter sub-bus and elects the "Standby" EMN for it. Meanwhile, the "Active" EMN also activates the power source for the daughter sub-bus upfront and assigns a set of tasks to be executed by the daughter sub-bus. After all the relevant preparations have been done, the bus switches connected to the bus section where the bus is to be severed opens (line 708). The two new sub-buses are automatically terminated properly at their new endpoints. The mother sub-bus runs normally as before while continuing to monitoring the voltage of the severed bus section from its end. The voltage of the severed bus section turns low after sectioning and will turn high when the daughter sub-bus has completed the assigned tasks and request to re-join the bus. In the daughter sub-bus, the elected "Standby" EMN confirms the bus sectioning (block 709) by detecting the loss of the power or bus activity and then starts executing the assigned tasks in the limp mode (block 711). If an enumeration on the new daughter sub-bus is needed, the "Standby" EMN may promote itself to the "Deputy" state and initiate a bus enumeration. Once the assigned tasks are completed, the "Deputy" EMN demotes itself back to the "Standby" state and requests to re-join the mother sub-bus by closing the bus switch where it was severed from the mother sub-bus (block 717). As a result, the voltage of the severed bus section turns high, which can be detected by the mother sub-bus with the "Active" EMN. Once the request for the bus re-joining is detected, the "Active" EMN also closes the bus switch where the daughter sub-bus was severed (block 719). Therefore, the two sub-buses re-join together and then the tool string resumes operating as a whole bus (block 705).

For example, the SDM is assumed to occur at the bus section between the Node 4 and Node 5 in FIG. 2. It is further assumed that the Node 4 is the "Active" EMN and the Node N is elected as the "Standby" EMN for the daughter sub-bus, including Nodes 5-N. Once the sectioning configurations have completed, the Node 4 opens its bus switch SB 209 while the Node 5 opens its bus switch SA 208. Simultaneously, the terminators 205 in both Node 4 and Node 5 are connected to the mother sub-bus and the daughter sub-bus, respectively. Once the two sub-buses are terminated properly, they start normal operation. When the daughter sub-bus completes the assigned tasks, it closes the bus switch SA 208 in the Node 5 to request to re-join the mother sub-bus, which in turn powers on the severed bus section in Node 4. For example, line B0 in Node 4 will be powered on, which can be detected by the main controller block 301 of Node 4. When the mother sub-bus detects the voltage on the severed bus section, the "Active" EMN Node 4 closes the bus switch SB 209 in the Node 4 to re-join the two sub-buses. The terminators in both Node 4 and Node 5 are automatically disconnected from the bus upon closing their respective bus switches to avoid repetitive bus termination.

Although in the disclosed embodiment in FIG. 3, four switches are used to achieve a universal applicability to all applications, one or two of the four switches might be spared in the specific circumstances without significant loss of the disclosed benefits and without departing from the principles and methods disclosed herein.

For example, in some low-speed or short tool bus systems, signal reflection without bus terminations might be insignificant, the bus terminator switch might not be used or be replaced by manually-set terminators.

As an additional example, in some tool bus systems, the direction of bus current is fixed and does not change in the operation. If the unidirectional switch is used as in FIG. 3, the bus switch that has its body diode forward in the current direction might be spared. For example, if the bus current comes from the left bus section 204A in the FIG. 3, the bus switch 208d is dispensable as the its body diode always passes the bus signal.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

The invention claimed is:

1. A method of automatically enumerating nodes of a tool bus in a bottom hole assembly (BHA), comprising:
   powering a first section of the bus with a power source of a master node;
   testing, with a first test by the master node, the first section of the bus;
   connecting tool electronics of an adjacent node to the first section of the bus;
   testing, with a second test by the master node, the tool electronics of the adjacent node;
   updating, by the master node, an enumeration log based on an outcome of the first test on the first section of the bus and the second test on the tool electronics of the adjacent node;

automatically generating, by the master node, a tool string layout map based on the enumeration log, wherein the tool string layout map includes an identification and a relative location of the adjacent node on the bus;

detecting a sectioning event at a bus section between two nodes of the bus, the sectioning event creating a mother sub-bus comprising the master node and a daughter sub-bus;

opening a bus switch connecting a first of the two nodes to the bus section, the mother sub-bus comprising the first of the two nodes;

opening a bus switch connecting a second of the two nodes to the bus section, the daughter sub-bus comprising the second of the two nodes;

detecting, by an enumeration master node in a standby state and connected to the daughter sub-bus, a loss of power or activity on the daughter sub-bus;

in response to the detecting, the enumeration master node automatically promoting itself to a deputy state to initiate an enumeration of the daughter sub-bus.

2. The method of claim 1, wherein the enumeration master node waits for a delay period before promoting itself to the deputy state.

3. The method of claim 2, wherein the delay period is based upon a relative location of the enumeration master node from the master node on the bus.

4. The method of claim 1, further comprising:
detecting a voltage on the daughter sub-bus after initiating the enumeration of the daughter sub-bus;
stopping the enumeration of the daughter sub-bus if the voltage is for a higher priority than the enumeration master node.

5. The method of claim 4, wherein the higher priority voltage is a different voltage than a voltage produced by the enumeration master node for the enumeration of the daughter sub-bus.

6. The method of claim 1, further comprising:
determining that a short circuit is not present on the bus section on the daughter sub-bus at the second of the two nodes on the daughter sub-bus;
in response to the determination, repeatedly opening and closing the bus switch of the second of the two nodes in the daughter sub-bus that connects to the bus section;
detecting a handshaking signal from the mother sub-bus when the bus switch of the second of the two nodes is open to confirm that an open circuit fault is not present on the bus section;
upon detecting the handshaking signal, holding the bus switch of the second of the two nodes closed to maintain a voltage on the bus section; and
re-joining the daughter sub-bus to the mother sub-bus.

7. The method of claim 6, further comprising:
placing a second handshaking signal on the bus section when the bus switch of the second of the two nodes is closed during the repeatedly opening and closing of the bus switch of the second of the two nodes.

8. The method of claim 7, wherein the handshaking signal includes a different pulse pattern from the second handshaking signal.

9. The method of claim 6, wherein the daughter sub-bus uses an operating voltage different than the mother sub-bus.

10. The method of claim 9, wherein detecting the handshaking signal includes detecting a voltage different than the operating voltage of the daughter sub-bus.

11. The method of claim 10, wherein if the operating voltage of the daughter sub-bus is lower than that of the mother sub-bus, detecting the handshaking signal includes detecting a higher-voltage of the mother sub-bus.

12. The method of claim 10, wherein if the operating voltage of the daughter sub-bus is higher than that of the mother sub-bus, detecting the handshaking signal includes detecting a current drawn by the mother sub-bus.

\* \* \* \* \*